US006740282B1

(12) United States Patent
Svedberg

(10) Patent No.: US 6,740,282 B1
(45) Date of Patent: May 25, 2004

(54) METHOD AND DEVICE FOR MAGNETIC ALIGNMENT OF FIBRES

(76) Inventor: Björn Svedberg, Högalidsgatan 33, S-117 30 Stockholm (SE)

( * ) Notice: Subject to any disclaimer, the term of this patent is extended or adjusted under 35 U.S.C. 154(b) by 0 days.

(21) Appl. No.: 09/720,105

(22) PCT Filed: Jun. 24, 1999

(86) PCT No.: PCT/SE99/01150

§ 371 (c)(1),
(2), (4) Date: Dec. 21, 2000

(87) PCT Pub. No.: WO99/67072

PCT Pub. Date: Dec. 29, 1999

(30) Foreign Application Priority Data

Jun. 24, 1998 (SE) .............................................. 9802245

(51) Int. Cl.[7] ......................... B29C 71/04; B29C 67/00; B28B 1/52; B28B 1/08

(52) U.S. Cl. ....................... 264/426; 264/437; 264/439; 264/440; 264/31; 264/108; 264/70; 264/71; 425/3; 425/113; 425/224; 425/380

(58) Field of Search ................................ 264/426, 437, 264/31, 333, 70, 71, 439, 440; 425/3, 113, 224, 380

(56) References Cited

U.S. PATENT DOCUMENTS 2,849,312 A * 8/1958 Peterman .................... 219/772
3,423,492 A * 1/1969 Jonell et al. .................. 264/70
3,767,505 A * 10/1973 Coran et al. ................ 156/276
3,860,368 A * 1/1975 Kerttula et al. ............. 100/917
3,867,299 A * 2/1975 Rohatgi ............... 252/62.51 R
4,062,913 A * 12/1977 Miller et al. ................. 106/644
4,111,294 A * 9/1978 Carpenter et al. ......... 156/62.2
4,159,911 A * 7/1979 Takazuka .................... 106/644
4,444,550 A * 4/1984 Loubier ......................... 425/3
5,366,676 A * 11/1994 Kobayashi .................. 264/150
5,628,955 A * 5/1997 Houk ......................... 264/108
5,840,241 A * 11/1998 Bishop et al. ......... 204/157.42

FOREIGN PATENT DOCUMENTS

JP (59) 041 213 3/1984
JP (60) 141 506 7/1985
JP 61-66607 A * 4/1986
JP 3-9823 A * 1/1991
JP 11-293301 A * 10/1999
SU 168 0500 9/1991

* cited by examiner

*Primary Examiner*—Michael Colaianni
*Assistant Examiner*—Michael I. Poe
(74) *Attorney, Agent, or Firm*—Blank Rome LLP

(57) ABSTRACT

Magnetizable fibers dispersed in a viscous body, particularly reinforcing metal fibers dispersed in a wet cementitious material, is carried out by providing a fiber aligning member (15) having a nonmagnetic wall (17) including a first wall portion (17A) and a second wall portion (17B), moving the aligning member (15) relative to the viscous body with the first wall portion (17A) leading and the second portion (17B) trailing it and with the first and second wall portions (17A, 17B) contacting the viscous body, and directing a magnetic field into the viscous body through the first wall portion (17A) to subject the fibers (F) to a moving magnetic field. A device for performing the method comprises: a fiber aligning member (15) having a nonmagnetic wall (17) including a first wall portion (17A) and a second wall portion (17B); and a magnet device (18) disposed adjacent the first wall portion (17A) for directing a magnetic field into the viscous body through the first wall portion (17A), and a manipulating device (14) for moving the fiber aligning member (15) relative to the viscous body with the first wall portion (17A) ahead of the second wall portion (17B) and with the first and second wall portions (17A, 17B) contacting the viscous body.

21 Claims, 6 Drawing Sheets

METHOD AND DEVICE FOR MAGNETIC ALIGNMENT OF FIBRES

FIELD OF THE INVENTION

This invention relates to methods and devices for magnetic alignment of fibres dispersed in a viscous body. The invention has particular utility in its application to alignment (parallelisation) of metal fibres, notably steel fibres, in newly cast and accordingly wet concrete and other cementitious or pasty materials. For that reason, the invention will be described with this application taken as an illustrative example.

BACKGROUND OF THE INVENTION

It is known to reinforce concrete by adding steel fibres to the viscous concrete before it is cast. Usually, the fibres have a length of 2.5 to 8 cm and a diameter in the range of 0.5 to 1 mm and thus are relatively rigid. During the mixing of the fibres and the concrete, the fibres are dispersed in the concrete and orientated randomly in three dimensions so that the cast and hardened concrete body will be reinforced in three dimensions.

Many, or even most, concrete structures are only stressed in one or two dimensions, however, so that reinforcement in one or two dimensions would be adequate. This is so in the case of concrete floor slabs and concrete road pavements, to mention only two examples.

It therefore is desirable in such concrete structures to be able to align the fibres in one or two dimensions, corresponding to the direction or directions of stress, so that the fibre reinforcement material is utilised economically. It also is desirable to be able to concentrate the fibres to a zone or zones of the concrete structure where the demand for reinforcement is the greatest.

According to a known method for one-dimensional alignment of steel fibres in slabs of wet concrete newly cast in a form, a magnetic field is directed through the newly cast, viscous concrete body in the casting form and displaced relative to the form from one end or side thereof to the other in order to apply a temporary aligning force to the individual fibres for aligning them in the direction of relative movement. To facilitate the aligning movement of the fibres under the action of the magnetic field, the concrete body is vibrated during the relative movement of the magnetic field and the concrete body.

In the known method, the magnet field is applied by means of a magnet device which is positioned outside the newly cast concrete body and straddles it and also the form in which it has been cast. Magnetic fibre alignment in this manner is impracticable in many cases, however, such as in the case of concrete bodies cast in situ. Large slabs or pavements cast on the ground are two examples of concrete bodies to which the known method is difficult to apply.

In the method and device according to the present invention as defined in the claims, magnetic alignment of magnetisable fibres dispersed in a viscous body is carried out by means of a fibre aligning member having a nonmagnetic wall. A magnetic field is directed into the viscous body through a first portion of the nonmagnetic wall while the fibre aligning member is being moved relative to the viscous body with the nonmagnetic wall in contact with it with a second portion of the nonmagnetic portion trailing the first portion. Accordingly, the fibres are temporarily subjected to the magnetic field as the first portion moves past them.

BRIEF SUMMARY OF THE INVENTION

The fibre aligning member may be partially or completely immersed in the viscous body as it is moved relative to the viscous body with the first portion of the magnetic wall ahead of the second portion and thus trailed by the latter.

During the relative moment, the fibres in the vicinity of the first portion of the nonmagnetic wall are magnetically attracted towards the first portion. However, they are prevented from coming into contact with the magnetic device by the nonmagnetic wall, which forms a screen or barrier that separates the magnet device from the viscous material in which the fibres are dispersed.

The fibre aligning member therefore attracts the fibres and tends to pull them along in the direction of its movement relative to the viscous body. Because of its viscosity, the material of the viscous body prevents the fibres from moving too rapidly towards the aligning member and sticking to it. Thus, the fibre aligning member will move relative to the fibres and subject them to the magnetic force only temporarily. Since the magnetic force has a component in the direction of relative moment of the fibre aligning member and the viscous body, it tends to align the fibres in that direction as it moves past them.

Preferably, the material from which the viscous body is formed is vibrated adjacent the fibre aligning member so that the aligning movement of the fibres is facilitated.

It accordingly is possible, applying the principles of the invention, to align randomly dispersed fibres in a cementitious or other viscous or pasty material in a simple manner. At the same time, a concentration of the fibres to a plane along which the fibre aligning member is moved is achieved. This plane may be in a zone of the viscous body, which in use of the hardened concrete body will have to absorb a heavy tensile stress.

The invention will be more fully understood from the following description with reference to the accompanying drawings showing application of the invention to the production of pavements or other slabs of concrete cast on the ground.

Figure 1:
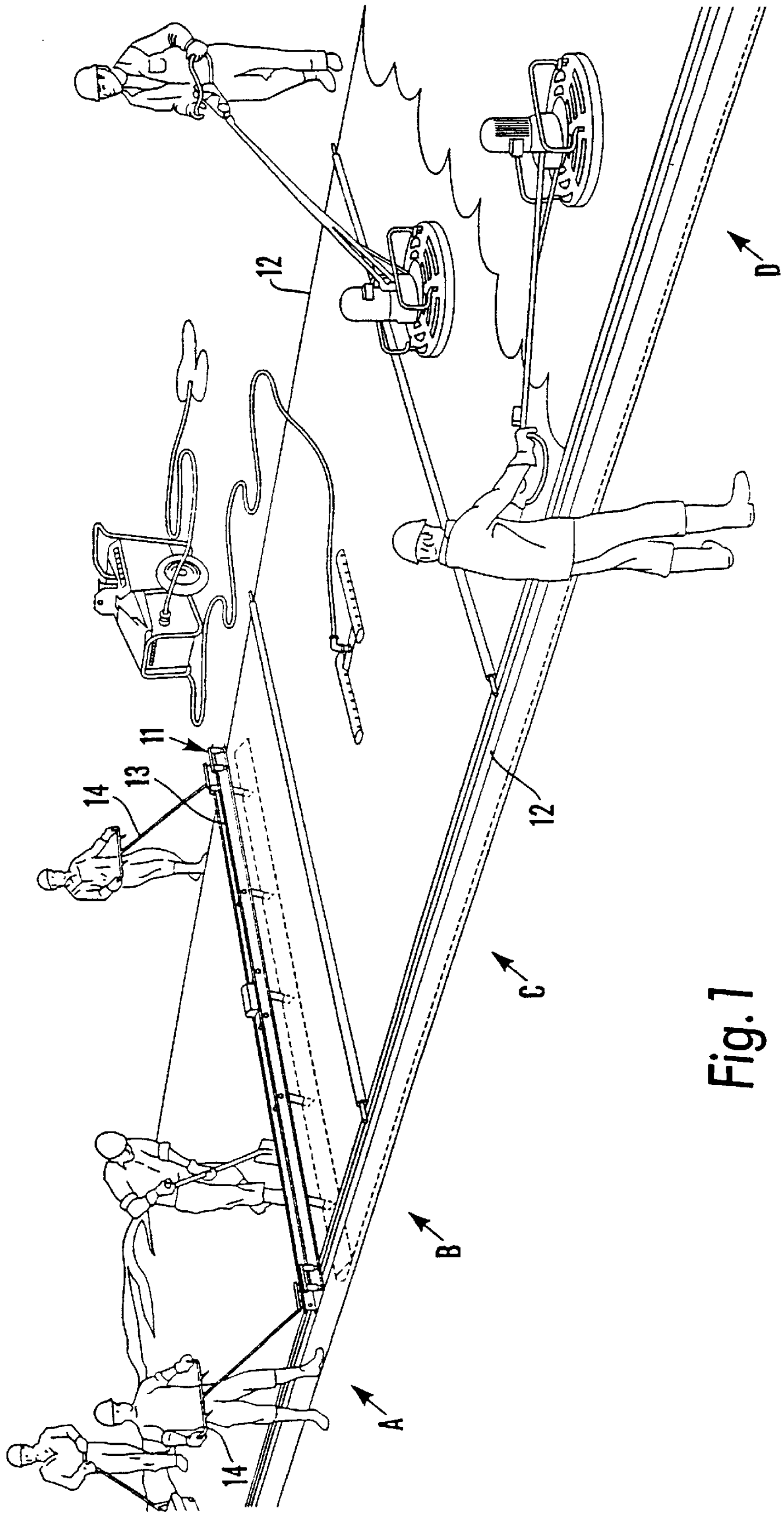
FIG. 1 is an overview illustration showing successive steps in the production of a concrete pavement on the ground, one of the steps being alignment of reinforcing steel fibres in accordance with the invention.

As shown by way of example in FIG. 1, the invention is applied to the production of a concrete pavement or slab on the ground. The pavement is shown at different successive steps during its production, the first step being shown to the left and the last step being shown to the right. Furthest to the left, at A, the wet concrete is cast after reinforcement fibres of steel or some other magnetisable material has been added to the concrete and uniformly dispersed in it with random orientation. Then, at B, the wet concrete is vibrated and the reinforcing fibres are aligned lengthwise using a fibre alignment device 11 embodying the invention. The fibre alignment device 11 is supported by and slidable on rails 12 positioned along the longitudinal edges of the pavement. At C the wet concrete with the aligned fibres is vacuum treated and at D the pavement is smoothed.

The fibre aligning device 11 comprises a horizontal main beam 13 extending across the strip of ground to be paved and resting on the rails 12. It is manually displaced and controlled by means of control rods 14 with handlebars.

DETAILED DESCRIPTION OF THE INVENTION

A straight horizontal fibre aligning member 15 in the shape of a beam or bar is suspended from the main beam 13 by means of hangers 16 which are vertically adjustable to permit positioning of the aligning member 15 at a selected height. The aligning member 15 extends across the entire space between the rails 12.

An elongate housing or shell 17 forming part of the aligning member 15 is drop-shaped in cross-section so that it resembles an airfoil, the rounded first or leading edge of which is directed such that it will be foremost when the aligning device 11 with the aligning member 15 is displaced in the proper direction, to the left in FIG. 1, during the aligning operation. This housing 17 is made of aluminium or some other suitable nonmagnetic material.

Inside the housing 17 of the aligning member 15, along a foremost or first wall portion 17A of the housing, a rotatably journalled magnet roll 18 extends along the entire length of the aligning member. The first portion 17A of the wall of the housing is arcuate in cross-section and the axis L of the magnet roll 18 coincides with the axis of the first wall portion 17A.

Three permanent magnets 19, made of neodym, for example, are uniformly distributed about the magnet roll 18, each such magnet subtending about ⅙ of the circumference of the magnet roll. The outer surfaces of the magnets 19 are positioned on a circular cylindrical surface concentric with and closely spaced from the first portion 17A of the wall of the housing 17. Accordingly, when the magnet roll 18 is caused to rotate as described below, the permanent magnets 19 will move close to the inner side of the first wall portion 17A.

Figure 3:
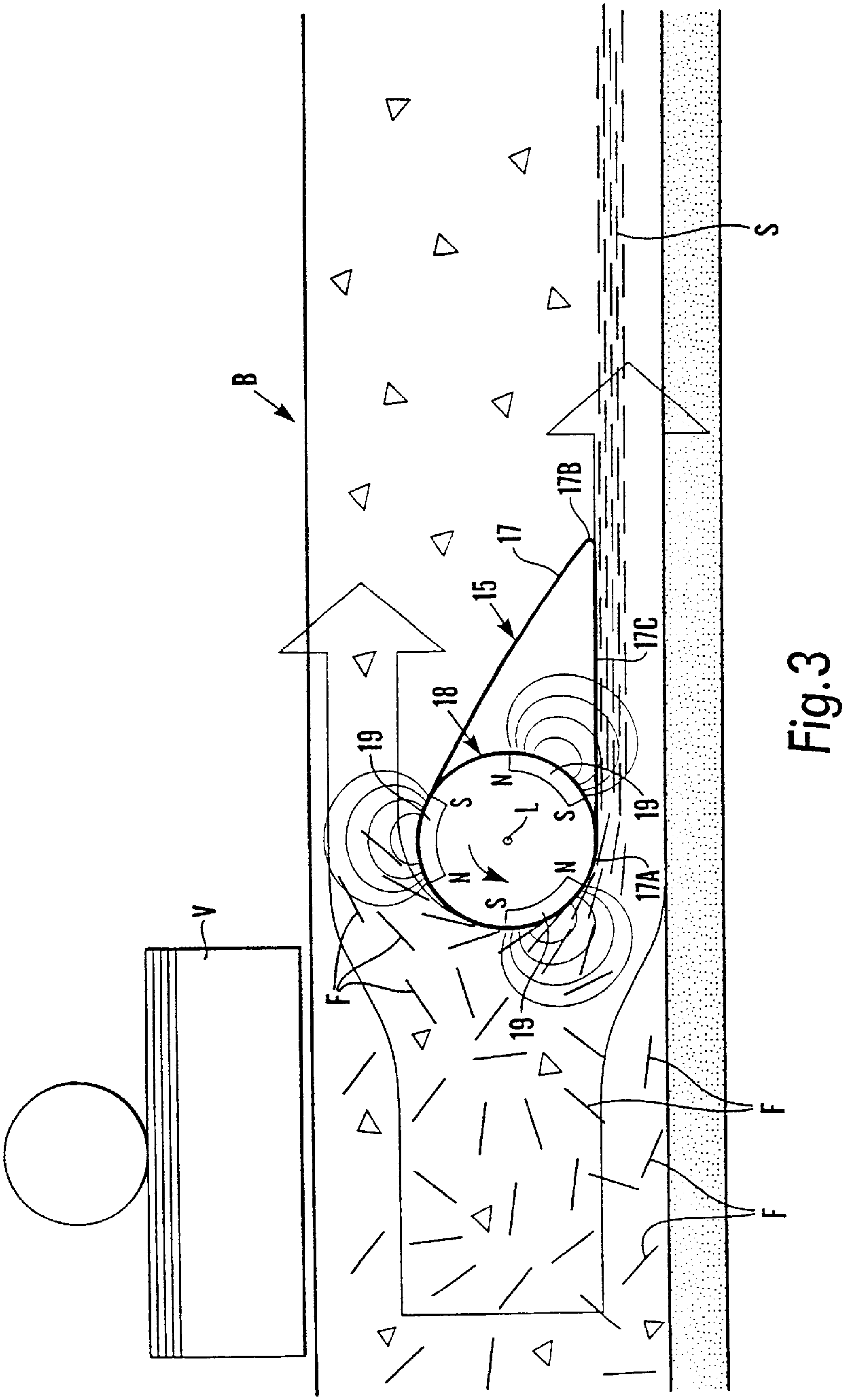
FIG. 3 is a cross-sectional view of the section of the concrete pavement of FIG. 1 in which the fibre alignment is being carried out.

As indicated by the north and south pole designations N and S and the magnetic field lines in FIG. 3, the magnets 19 are mounted on the magnet roll 18 such that the field lines run in planes which are perpendicular to the axis L of the magnet roll 18. In the illustrated embodiment the magnet roll 18 is rotated counter-clockwise, viewed as in FIG. 3, by a number of electric motors 20 spaced apart along the length of the aligning member 15. If desired or required, the direction of rotation of the magnet roll 18 can be reversible.

To permit adjustment of the aligning member 15 to a desired angle of attack, so that the trailing or second portion 17B of the wall of the housing 17 will be at a selected height, the aligning member is mounted for pivotal movement about an axis which is parallel to, e.g. coinciding with, the axis L of the roll 18. Locking means, not shown, are provided to lock the aligning member in a selected angular position.

During the fibre alignment operation the fibre aligning device 11 rests on the rails 12 with the aligning member 15 set at a height such that the lowermost segment of the first portion 17A of the wall of the housing 17 is relatively close to the underside of the cast layer of wet viscous concrete. Moreover, the aligning member 15 is adjusted angularly such that the second portion 17B of the wall of the housing 17 is at approximately the same height as the lowermost segment of the first wall portion 17A.

Figure 2:
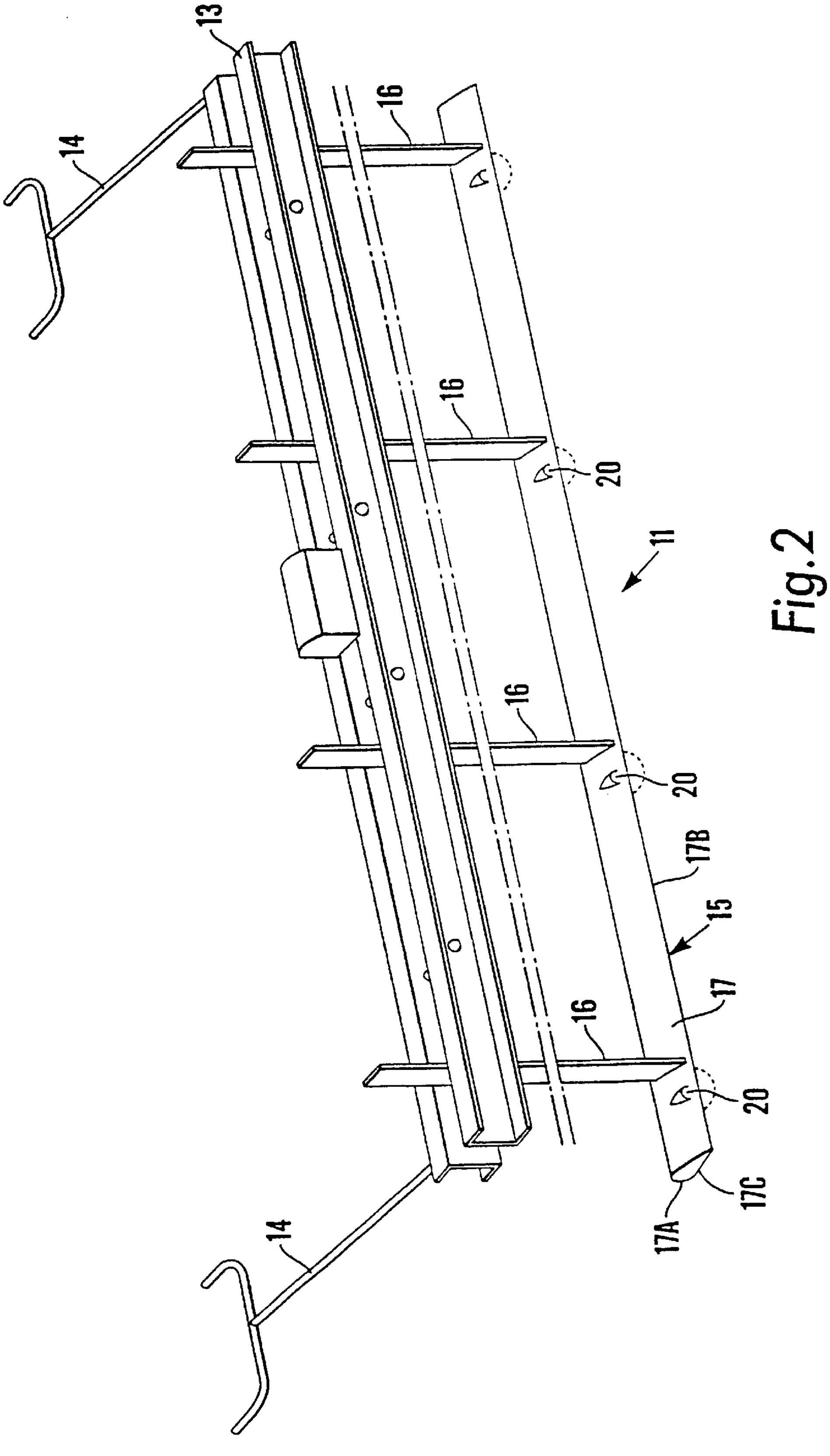
FIG. 2 is a perspective view of a fibre aligning device used in the fibre aligning step of FIG. 1.

After the aligning member 15 has been adjusted to the desired height and the desired angular position, the aligning device 11 is slowly displaced to the left as viewed in FIGS. 1–3 so that the first portion 17A of the wall of the housing 17 is ahead of and trailed by the second wall portion 17B. The magnet roll 18 rotates continuously in the direction indicated by an arrow (counter-clockwise), and a vibrator V supported by the aligning device 11 operates to vibrate the concrete in the region of the body of concrete in which the aligning member 15 operates.

As indicated by the outline arrows in FIG. 3, a portion of the concrete is displaced upwards and passes across the upper side of the aligning member 15 while another portion is displaced downwards and passes across the underside. During their movement along the inner side of the leading first wall portion 17A, the permanent magnets 19 provided on the magnet roll 18 will direct their magnetic fields into the concrete in front of, above and below the first wall portion 17A.

The magnetic fields, the field lines, of which generally run in planes which, are perpendicular to the axis L of rotation of the magnet roll 18, orbit counter-clockwise together with the roll. During their orbiting movement they apply to the reinforcement fibres F subtended by the magnetic fields a magnetic attraction force that tends to attract the fibres towards the leading first wall portion 17A of the housing 17 and to align the fibres along the field line planes. At the same time, fibres positioned above the level of the underside of the aligning member 15 are drawn downwards by the magnetic attraction and the downward diversion of concrete, and fibres below that level are drawn upwards.

Accordingly, the fibres F, or at least a large proportion of them, tend to move towards the underside of the aligning member 15 and form a horizontal layer of fibres aligned in the relative direction of movement of the concrete body and the aligning member.

When a fibre F reaches a position abreast of the intermediate flat wall portion 17C of the underside of the housing 17, the strength of the magnetic field, and thus the magnetic attraction on the fibre, decreases sharply because the magnet 19 which is closest to the transition between the first wall portion 17A and the intermediate wall portion 17C moves upwardly away from the fibre. Accordingly, the magnetic attraction on the fibre F will no longer be strong enough to be pull the fibre along with the aligning member 15, so that the fibre will be left behind in the aligned position in the fibre layer.

If it is desirable to concentrate the fibres F in a layer in the upper region of the concrete body, the aligning member 15 is angularly adjusted and, if necessary, bodily displaced vertically to a position in which the first and second portions 17A, 17B of the wall of the housing 17 are approximately in the same horizontal plane and at the desired height. Moreover, the direction of rotation of the magnet roll 18 is reversed.

Figure 4:
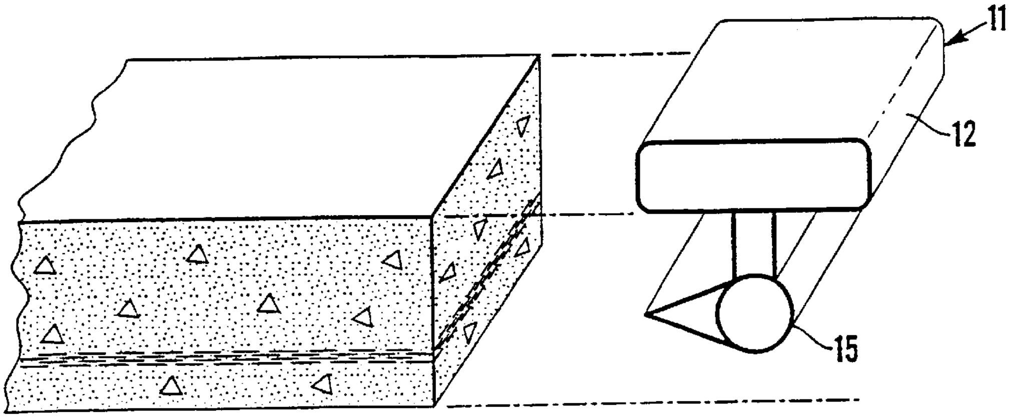
FIGS. 4–6 are diagrammatic views of three slabs of different heights cast on the ground and shown together with fibre aligning devices according to the invention.
Figure 5:
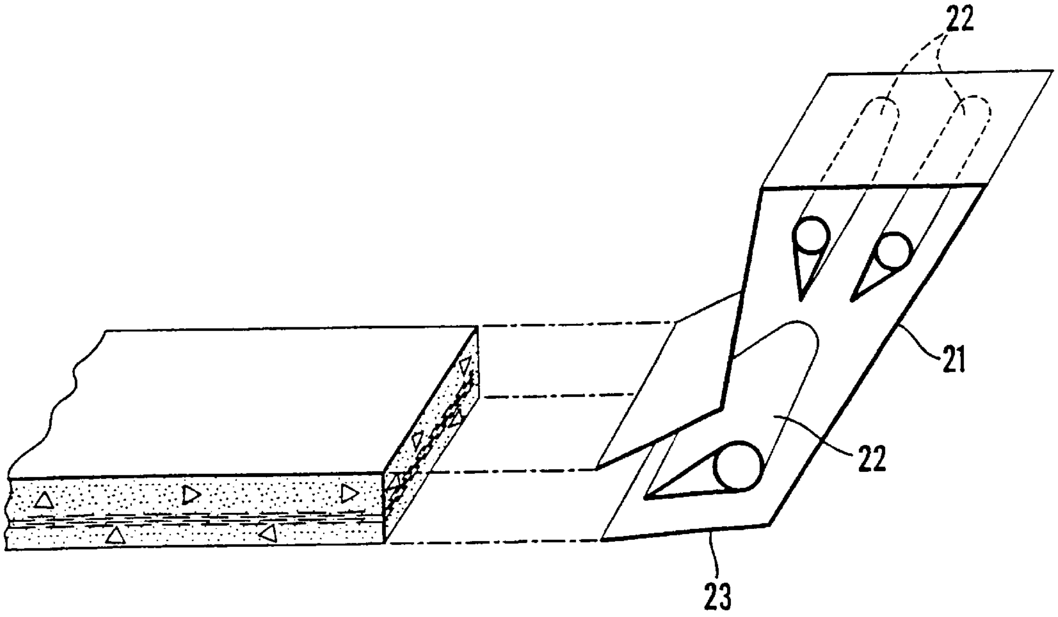
Figure 6:
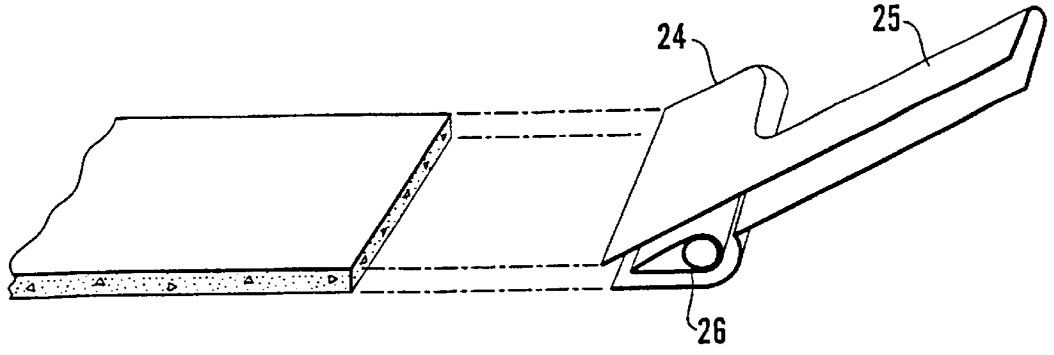

FIGS. 4, 5 and 6 diagrammatically show three different ways of carrying out the invention. The technique represented by FIG. 4 essentially corresponds to the technique shown in FIGS. 1–3 and described above. Accordingly, the alignment of the fibres takes place after the concrete has been placed on the ground.

FIGS. 5 and 6 show embodiments in which the alignment of the fibres takes place during the placement of the concrete layer on the ground. More particularly, FIG. 5 shows a device for placing the concrete and aligning the fibres which is intended to be carried by a laying vehicle moving along the surface on which the reinforced concrete body is to be placed. In this device the alignment of the fibres takes place in two steps. The wet concrete with admixed reinforcing fibres is fed into a steeply inclined bin 21 in which two aligning members 22 similar to the aligning member 15 of FIGS. 1 to 3 are positioned side by side. An additional aligning member 22 similar to the aligning member 15 is positioned in a laying nozzle 23. This nozzle forms a downward continuation of the bin 21 and has a spout with a straight discharge opening through which a layer of concrete of the desired thickness is discharged and placed on the ground.

Figure 7:
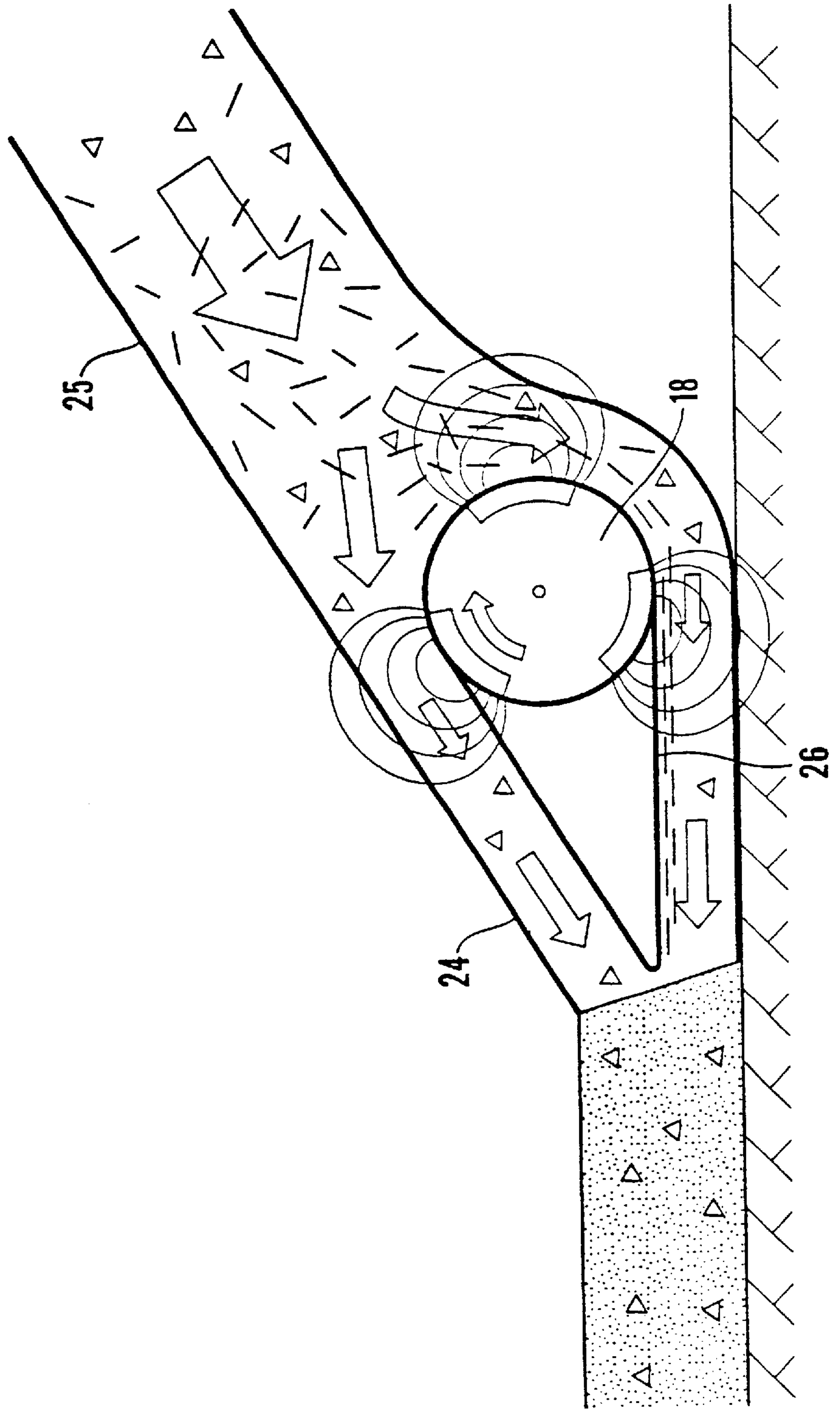
FIG. 7 is a cross-sectional view showing a modification of the aligning device of FIG. 6.

The device shown in FIG. 6 is primarily intended to be used for laying of relatively thin and narrow layers and is manipulated manually. It includes a laying nozzle 24 resembling the laying nozzle 23 in FIG. 5 and a tubular shaft 25 into which wet concrete with admixed fibres is fed from a concrete pump (not shown) through a hose. Within the laying nozzle 24 an aligning member 26 similar to the aligning member 15 of FIGS. 1 to 3 is disposed. FIG. 7 shows the device in FIG. 6 in greater detail.

Figure 8:
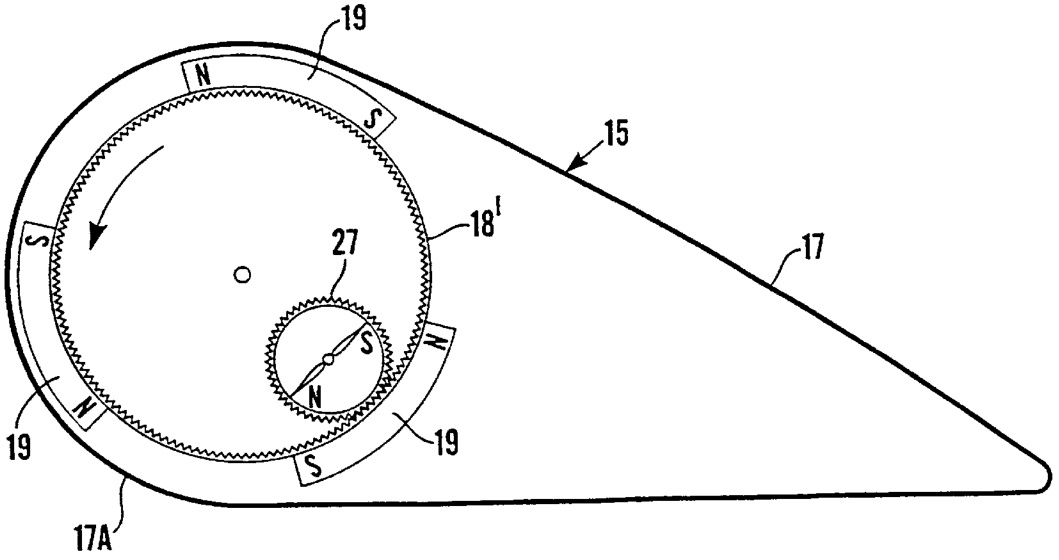
FIG. 8 is a cross-sectional view showing a modification of the aligning device of FIG. 3.

FIG. 8 shows a modification of the aligning member 15 of FIGS. 1 to 3. In this case there is provided inside the rotatable magnet roll 18' a stationary second magnet roll 27 which is positioned in the rear region of the first or leading portion 17A of the wall of the housing 17. It is arranged in operation to rotate at a speed which has a certain numerical relationship, 3:1, to the speed at which the magnet roll 18' rotates. One half of the magnet roll 27 is magnetised as indicated by the pole designations N and S while the other half is substantially unmagnetised. Whenever one of the permanent magnets 19 of the rotating magnet roll 18 enters the region in which the magnet roll 27 is positioned, the magnetic field of that magnet 19 will close its field lines through the magnet roll 27 so that only a small portion of the magnetic field is directed into the concrete body. Consequently, the attraction the magnet roll 18' exerts on the reinforcing fibres in the concrete body, and thus the tendency of the aligning member 15 to pull the fibres along, is very sharply reduced when the fibres are in the region beneath the magnet roll 27.

Several modifications of the presently preferred aligning method and device shown in the drawings are possible within the scope of the invention as defined in the claims.

For example, the cross-section of the housing 17 of the aligning member 15 may be substantially symmetrical with respect to a plane that passes through the axis L of the magnet roll 18 and is substantially perpendicular to another plane that passes through the axis L and the edge of the second portion 17B of the wall of the housing 17. With this symmetrical cross-section, the aligning member accordingly has a thin edge portion on opposite sides of the thickest section of the housing 17 where the magnet roll 18 is positioned so that it can be moved in opposite directions in the concrete, e.g. across the width of a wide pavement strip, without encountering a great resistance to the movement.

In this modification, it may be preferable to have two magnet rolls 18, which are associated with opposite sides of the housing 17 and rotate in opposite directions. Alternatively, a single magnet roll 18 may be provided which has only a single magnet on the circumference and is rotated alternately in opposite directions through an angle of more than 180 degrees and preferably approximately 270 degrees. The magnetic field will then be directed alternately into the concrete above the aligning member and into the concrete below the aligning member. This mode of intermittent, reversed rotation ensures that the fibres are temporarily subjected to a magnetic pulling force in the direction in which the aligning member 15 moves relative to the concrete.

Although in the embodiment of the invention described and illustrated in the drawings the fibres are aligned horizontally in the direction of relative movement of the aligning member and the concrete, it is possible to align the fibres in a horizontal direction perpendicular to the direction of relative movement if the magnets 19 on the magnet roll 18 are magnetised such that their magnetic field lines run predominantly in planes extending along the length of the aligning member 15.

It is also be noted that the magnets or other means producing the magnetic fields, or all such magnets or other means, need not necessarily be movable relative to the aligning member. Fixed permanent magnets or other elements producing magnetic fields may be incorporated in the aligning member to direct constant or intermittent magnetic fields into the material containing the magnetisable fibres to align them.

What is claimed is:

1. A method of magnetically aligning magnetisable fibres dispersed in a viscous body, comprising:

providing a fibre aligning member (15) having a nonmagnetic wall (17) including a first wall portion (17A) and a second wall portion (17B), moving the aligning member (15) relative to the viscous body with the first wall portion (17A) of the nonmagnetic wall (17) leading and the second wall portion (17B) trailing it and with the first and second wall portions (17A, 17B) contacting the viscous body, and directing a magnetic field into the viscous body through the first wall portion (17A) of the nonmagnetic wall (17) to subject the fibres (F) in the viscous body to a magnetic field that moves with respect to the nonmagnetic wall (17).

2. A method according to claim 1 in which the magnetic field is applied to the viscous body through the first wall portion (17A) of the nonmagnetic wall (17).

3. A method according to claim 1 in which the magnetic field is applied to the viscous body exclusively through the first wall portion (17A) of the nonmagnetic wall (17).

4. A method according to claim 1 in which the fibre aligning member (15) is moved substantially parallel to a surface of the viscous body.

5. A method according to claim 1 in which the fibre aligning member (15) is at least partially immersed in the viscous body.

6. A method according to claim 1 in which the field lines of the magnetic field run predominantly in planes which are substantially transverse to the nonmagnetic wall (17) and substantially parallel to the direction of relative movement of the fibre aligning member (15) and the viscous body.

7. A method according to claim 1 in which the viscous body is a substantially horizontal slab.

8. A method according to claim 1 in which the viscous body is a slab or layer of wet concrete.

9. A method according to claim 1 in which the viscous body is vibrated during the movement of the fibre aligning member (15) relative to the viscous body.

10. A method of magnetically aligning magnetisable fibres dispersed in a viscous body, comprising:

providing a fibre aligning member (15) having a nonmagnetic wall (17) including a first wall portion (17A) and a second wall portion (17B), moving the aligning member (15) relative to the viscous body with the first wall portion (17A) of the nonmagnetic wall (17) leading and the second wall portion (17B) trailing it and with the first and second wall portions (17A, 17B) contacting the viscous body, and directing a magnetic field into the viscous body through the first wall portion (17A) of the nonmagnetic wall (17) to subject the fibres (F) in the viscous body to a magnetic field that moves with respect to the nonmagnetic wall (17), such that the fibres tend to move towards a side of the aligning member.

11. A method of magnetically aligning magnetisable fibres dispersed in a viscous body, comprising:

providing a fibre aligning member (15) having a nonmagnetic wall (17) including a first wall portion (17A) and a second wall portion (17B), moving the aligning member (15) relative to the viscous body with the first wall portion (17A) of the nonmagnetic wall (17) leading and the second wall portion (17B) trailing it and with the first and second wall portions (17A, 17B) contacting the viscous body, and directing a magnetic field into the viscous body through the first wall portion (17A) of the nonmagnetic wall (17) to subject the fibres (F) in the viscous body to a moving magnetic field in which the magnetic field is directed into the viscous body by means of a magnetic member (18) which is disposed within the fibre aligning member (15) and angularly movable about an axis (L) extending along the first wall portion (17A) of the nonmagnetic wall (17).

12. A device for magnetically aligning magnetisable fibres distributed in a viscous body, comprising:

a fibre aligning member (15) having a nonmagnetic wall (17) including a first wall portion (17A) and a second wall portion (17B), and a magnet device (18) disposed adjacent the first wall portion (17A) of the nonmagnetic wall (17) for directing a magnetic field into the viscous body through the first wall portion (17A) of the nonmagnetic wall (17), said magnetic field moving with respect to the non-magnetic wall (17), and a manipulating device (14) for moving the fibre aligning member (15) relative to the viscous body with the first wall portion (17A) of the nonmagnetic wall (17) ahead of the second portion (17B) and with the first and second portions (17A, 17B) contacting the viscous body.

13. A device according to claim 12 in which the fibre aligning member (15) comprises a hollow elongate housing including the nonmagnetic wall (17) and accommodating the magnet device (18).

14. A device according to claim 12 in which the fibre aligning member (15) is disposed in a nozzle (21, 24) having a discharge opening for a viscous compound in which magnetisable fibres are dispersed, the first wall portion (17A) of the nonmagnetic wall (17) being directed away from the discharge opening.

15. A device for magnetically aligning magnetisable fibres distributed in a viscous body, comprising:

a fibre aligning member (15) having a nonmagnetic wall (17) including a first wall portion (17A) and a second wall portion (17B), and a magnet device (18) disposed adjacent the first wall portion (17A) of the nonmagnetic wall (17) for directing a magnetic field into the viscous body through the first wall portion (17A) of the nonmagnetic wall (17), said magnetic field moving with respect to the non-magnetic wall (17), and a manipulating device (14) for moving the fibre aligning member (15) relative to the viscous body with the first wall portion (17A) of the nonmagnetic wall (17) ahead of the second portion (17B) and with the first and second portions (17A, 17B) contacting the viscous body, such that the fibres tend to move towards a side of the aligning member.

16. A device for magnetically aligning magnetisable fibres distributed in a viscous body, comprising:

a fibre aligning member (15) having a hollow elongate housing including a nonmagnetic wall (17) including a first wall portion (17A) and a second wall portion (17B), a magnet device (18) disposed adjacent the first wall portion (17A) of the nonmagnetic wall (17) for directing a magnetic field into the viscous body through the first wall portion (17A) of the nonmagnetic wall (17), the magnet device (18) being positioned close to the nonmagnetic wall (17) adjacent the first wall portion (17A) and widely spaced-apart from the other parts of the nonmagnetic wall (17), and a manipulating device (14) for moving the fibre aligning member (15) relative to the viscous body with the first wall portion (17A) of the nonmagnetic wall (17) ahead of the second portion (17B) and with the first and second portions (17A, 17B) contacting the viscous body.

17. A device according to claim 16 which the magnet device (18) extends substantially throughout the length of the hollow housing (17).

18. A device for magnetically aligning magnetisable fibres distributed in a viscous body, comprising:

a fibre aligning member (15) having a nonmagnetic wall (17) including a first wall portion (17A) and a second wall portion (17B), and a magnet device (18) disposed adjacent the first wall portion (17A) of the nonmagnetic wall (17) for directing a magnetic field into the viscous body through the first wall portion (17A) of the nonmagnetic wall (17), the magnet device (18) including a cylindrical roll which is mounted inside the hollow housing (17) for angular movement about an axis (L) extending lengthwise of the housing and which carries at least one magnet on its circumferential surface, and a manipulating device (14) for moving the fibre aligning member (15) relative to the viscous body with the first wall portion (17A) of the nonmagnetic wall (17) ahead of the second portion (17B) and with the first and second portions (17A, 17B) contacting the viscous body.

19. A device according to claim 18, including a motor (20) for angularly moving the roll in the hollow housing (17).

20. A device according to claim 18 in which the first portion (17A) of the nonmagnetic wall (17) is concentric with the roll.

21. A device according to claim 20 in which the cross-section of the hollow housing (17) tapers from the first wall portion (17A) towards the second wall portion (17B).

* * * * *